US009786141B2

(12) United States Patent
Grabham (10) Patent No.: US 9,786,141 B2
(45) Date of Patent: Oct. 10, 2017

(54) PACKAGE DELIVERY NOTIFICATION AND PROTECTION DEVICE, SYSTEM AND METHOD

(71) Applicant: Package Guard, Inc, Seattle, WA (US)

(72) Inventor: Michael W. Grabham, Seattle, WA (US)

(73) Assignee: Package Guard, Inc, Seattle, WA (US)

( * ) Notice: Subject to any disclaimer, the term of this patent is extended or adjusted under 35 U.S.C. 154(b) by 0 days.

(21) Appl. No.: 15/160,917

(22) Filed: May 20, 2016

(65) Prior Publication Data

US 2016/0343220 A1 Nov. 24, 2016

Related U.S. Application Data

(60) Provisional application No. 62/164,346, filed on May 20, 2015.

(51) Int. Cl.
| | |
|---|---|
| *G08B 13/14* | (2006.01) |
| *G08B 3/10* | (2006.01) |
| *G08B 25/00* | (2006.01) |
| *G08B 25/08* | (2006.01) |
| *G06Q 10/08* | (2012.01) |

(52) U.S. Cl.
CPC ........... *G08B 13/1472* (2013.01); *G08B 3/10* (2013.01); *G08B 25/008* (2013.01); *G08B 25/08* (2013.01); *G06Q 10/0833* (2013.01)

(58) Field of Classification Search
CPC ...... G08B 13/1472; G08B 3/90; G08B 25/10; G08B 25/008; G08B 13/19608; G06F 17/68

USPC .... 340/568.1, 665, 666, 686.1, 3.1, 5.1, 5.3; 705/7; 382/103
See application file for complete search history.

(56) References Cited

U.S. PATENT DOCUMENTS

| | | | | |
|---|---|---|---|---|
| 6,356,196 B1 * | 3/2002 | Wong | ................. | G08B 13/1427 340/539.1 |
| 6,741,927 B2 * | 5/2004 | Jones | ..................... | G08G 1/123 340/989 |
| 2002/0087375 A1 * | 7/2002 | Griffin | ................... | G06Q 10/08 705/336 |
| 2015/0310381 A1 * | 10/2015 | Lyman | ................. | G06Q 10/083 705/330 |
| 2016/0180667 A1 * | 6/2016 | Bunker | ............ | G08B 13/19608 382/103 |

* cited by examiner

*Primary Examiner* — Toan N Pham
(74) *Attorney, Agent, or Firm* — Seed IP Law Group LLP (57) ABSTRACT

A package delivery notification and protection device includes a package sensor including a placement surface. The package sensor is configured to generate a sensor signal indicating whether a package has been placed on or removed from the placement surface. Wireless communications circuitry is configured to communicate over a wireless network and processing circuitry is coupled to the package sensor and to the wireless communications circuitry to communicate over the wireless network. The processing circuitry is configured to send a delivery notification over the wireless network responsive to the sensor signal indicating a package has been placed on the placement surface. The package delivery notification and protection device may include and alarm that the processing circuitry activates upon unauthorized removal of a delivered package from the placement surface.

21 Claims, 6 Drawing Sheets

PACKAGE DELIVERY NOTIFICATION AND PROTECTION DEVICE, SYSTEM AND METHOD

BACKGROUND

Technical Field

The present disclosure is directed generally to package delivery tracking and theft prevention, and more specifically to a package delivery notification and protection system and method of providing delivery information and reducing theft of delivered packages.

Description of the Related Art

Purchasing items online and having packages containing such items delivered to your doorstep is in this day and age nearly effortless. Thanks to companies like Amazon and Alibaba making such online purchases easy and inexpensive, the number of things that can be purchased online and delivered to homes and businesses is at an all-time high. Whether the purchased item is a $20 t-shirt, a $600 smart phone, groceries, or a bouquet of flowers, a person does not want the item to be stolen after the package has been delivered, which typically means the package has been left on the doorstep of the home of the purchaser. In this situation, the delivered package containing the item is vulnerable to theft until the package is retrieved from the doorstop. Thieves, particularly during the holiday season, may follow delivery trucks and watch the drivers of such delivery trucks deliver packages to the doorsteps of purchasers. The thieves may simply wait for a delivery driver to deposit a package on the doorstep of a purchaser and thereafter go and steal the package off the doorstep before the purchaser has a chance to retrieve the package.

In addition to concerns over theft of delivered packages, situations also commonly arise where a package is delivered and the recipient of the package is not even aware of this delivery. Various existing approaches to notifying a recipient of delivery are utilized by online companies such as Amazon, but the notifications provided by these approaches regarding delivery of the package to the destination address is limited and not always reliable.

There is a need for protecting from theft packages delivered to the doorsteps of online purchasers as well as for providing more reliable information relating to such deliveries.

BRIEF SUMMARY

In one embodiment of the present disclosure, a package delivery notification and protection device includes a package sensor including a placement surface. The package sensor is configured to generate a sensor signal indicating whether a package has been placed on or removed from the placement surface. Wireless communications circuitry is configured to communicate over a wireless network and processing circuitry is coupled to the package sensor and to the wireless communications circuitry to communicate over the wireless network. The processing circuitry is configured to send a delivery notification over the wireless network responsive to the sensor signal indicating a package has been placed on the placement surface. The package delivery notification and protection device may include and alarm that the processing circuitry activates upon unauthorized removal of a delivered package from the placement surface.

DETAILED DESCRIPTION

Figure 1:
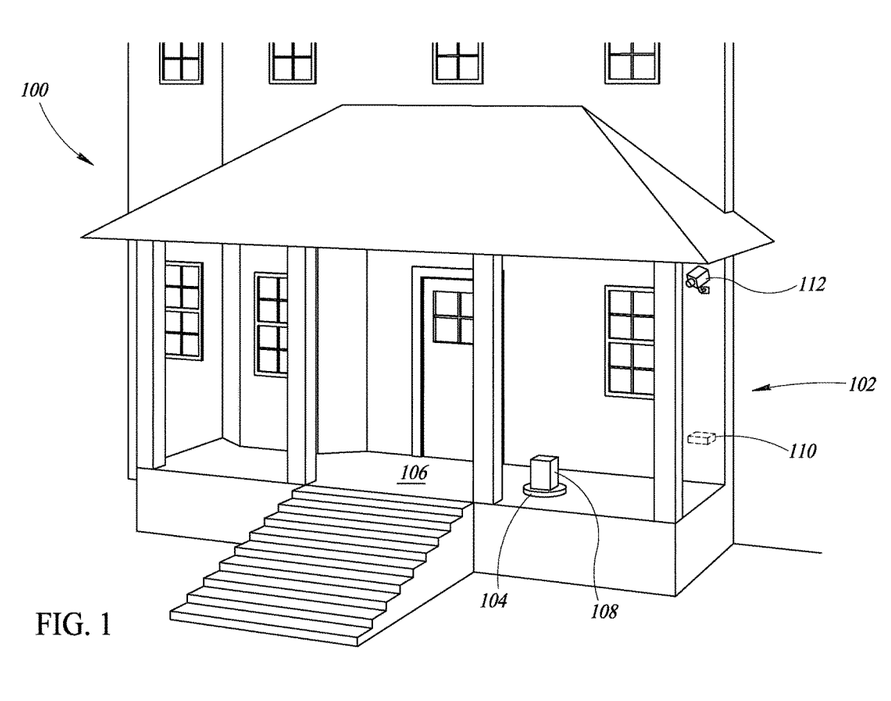
FIG. 1 is a perspective view of a house showing a portion of a package delivery notification and protection system including a package delivery notification and protection device located on a doorstep of the house according to one embodiment of the present disclosure.

FIG. 1 is a perspective view of a house 100 showing a portion of a package delivery notification and protection system 102 including a package delivery notification and protection device 104 located on a doorstep 106 of the house according to one embodiment of the present disclosure. In operation, when a package 108 is placed on the package delivery notification and protection device 104, the device communicates through a wireless access point or wireless router 110 to notify a package recipient (not shown in FIG. 1) that the package has been delivered and also notifies the package recipient of unauthorized removal of the package from the package delivery notification and protection device, as will be described in more detail below. The package delivery notification and protection device 104 may also include an audible alarm that the device activates upon unauthorized removal of the package 108 from the device. The package delivery notification and protection system 102 may also include a camera 112 that captures images or records video of the doorstep 106 of the house upon detection of motion on the doorstep or upon detection of unauthorized removal of the package 108 from the device 104, as will also be described in more detail below.

In the embodiment of FIG. 1, the package delivery notification and protection system 102 is shown as being utilized for the house 100 merely by way of example. The package delivery notification and protection system 102 may be utilized in any type of environment receiving deliveries of packages. Instead of the house 100 the package delivery notification and protection system 102 could be utilized at a company, a doctor's office, a hospital, a restaurant, and so on. In addition, the system 102 need not include the camera 112.

Figure 2:
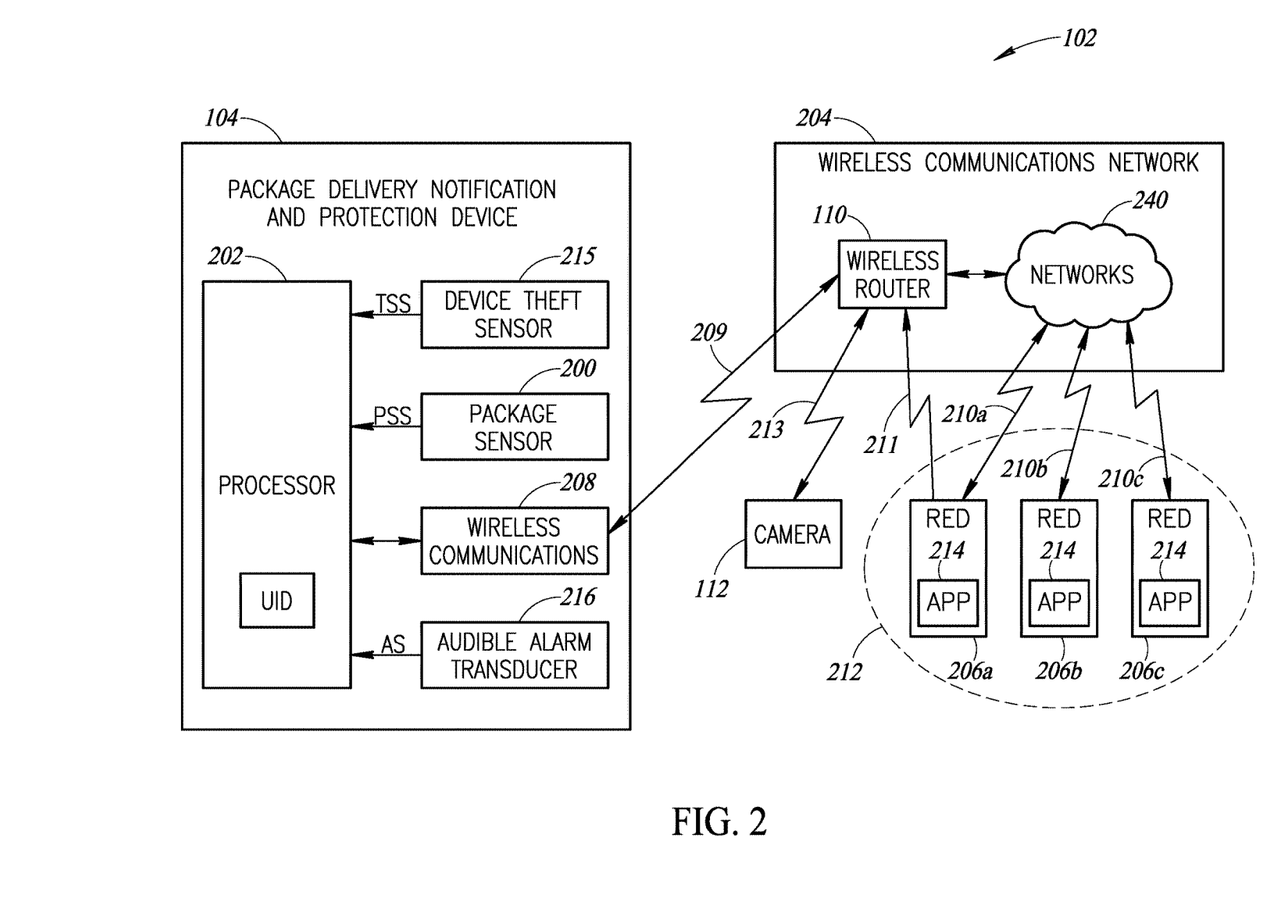
FIG. 2 is a functional block diagram of the package delivery notification and protection system of FIG. 1 according to one embodiment of the present disclosure.

FIG. 2 is a functional block diagram of the package delivery notification and protection system 102 of FIG. 1 according to one embodiment of the present disclosure. In the embodiment of FIG. 2, the package delivery notification and protection device includes a package sensor 200 that generates a package sensor signal PSS indicating whether a package (not shown) has been placed on or removed from the package sensor. The package sensor signal PSS is supplied to processing circuitry or a processor 202 that controls the overall operation of the package delivery notification and protection device 104. Upon receiving the package sensor signal PSS indicating a package has been placed on the package sensor 200, the processor 202 communicates a delivery notification over a wireless communications network 204 to a remote electronic device 206a to thereby notify a user of the remote electronic device that the package has been delivered, as will now be described in more detail below.

The processor 202 communicates over the wireless communications network 204 through wireless communications circuitry 208 contained in the package delivery notification and protection device 104. The wireless communications circuitry 208 may be any suitable type of wireless communications circuitry such as Wi-Fi circuitry, Bluetooth circuitry, or other wireless local area network (WLAN) circuitry. Where the system 102 is being utilized in a residential environment such as the house 100 of FIG. 1, the wireless communications circuitry 208 would typically be Wi-Fi circuitry as most homes include a WLAN utilizing a Wi-Fi communications standard. In this situation, the wireless router 110 contained in the house 100 would communicate with the wireless communication circuitry 208 over a wireless link 209 utilizing a Wi-Fi communications standard.

As seen in FIG. 2, the wireless router 110 and thus the WLAN of the house 100 is shown as being part of the wireless communications network 204. The wireless communications network 204 is meant to represent any communications networks over which the processor 202 communicates with the remote electronic devices 206. Thus, although the wireless communications network 204 is designated as a "wireless" communications network, this network includes any communications networks whether wired or wireless over which the processor 202 of the package delivery notification and protection device 104 communicates with the remote electronic device 206a. These communications networks are represented, in addition to the WLAN network including the wireless router 110, as networks 210 in FIG. 2 and may include the Internet, cellular telephone networks, broadband networks including broadband optical networks, and so on. The remote electronic device 206a communicates over the wireless communications network 204 through a wireless link 210a utilizing a suitable standard. For example, where the remote electronic device 206a is a smart phone the wireless link 210a corresponds to a suitable cellular network. Additional remote electronic devices 206b and 206c also communicate over respective wireless links 210b and 210c and the wireless connection's network 204 with the processor 202 of the package delivery notification a protection device 104. When any of the remote electronic devices 206 is proximate the WLAN of the house 100 (Figure) and thus proximate the wireless router 110, the remote electronic device would typically wirelessly connect to the router as illustrated through the wireless link 211 shown for the remote electronic device 206a, as will be appreciated by those skilled in the art.

The remote electronic devices 206a-c are part of a safe circle 212 associated with the package delivery notification a protection device 104, with only remote electronic devices that are part of the safe circle being authorized to communicate with the package delivery notification a protection device, as will be described in more detail below. The remote electronic devices 206a-c will be referred to simply as the remote electronic devices 206 in the following description when referring to any one of or all of the remote electronic devices, and the associated letter designation will be used only when referring to a specific one of the remote electronic devices.

The remote electronic devices 206a-c may be any suitable type of electronic device that can execute an application or "app" 214 that provides a user of the remote electronic device with an interface to the package delivery notification a protection device 104. Thus, each of the remote electronic devices 206 may be a smart phone, a tablet computer, an ultrabook computer, a laptop computer, a desktop computer, or any other device suitable for running the app 214 or a comparable program to allow the device to communicate over the wireless network 204 with the package delivery notification and protection device 104. The camera 112 is also coupled to the WLAN of the house 100 (FIG. 1) including the wireless router 110 as illustrated through the wireless link 213 in FIG. 2. The operation of the camera 112 in the package delivery notification and protection system 102 will be described in more detail below.

In the embodiment of FIG. 2, the package delivery notification and protection device 104 further includes a device theft sensor 215 that detects movement of the package delivery notification a protection device such as would occur if someone were to remove the device from the doorstep 106 of the house 100 of FIG. 1. The device theft sensor 214 may be, for example, an accelerometer or other suitable sensor that generates a theft sensor signal TSS in response to movement of the device 104. The TSS signal is supplied to the processor 202 which, in response to receiving the TSS signal indicating movement of the device 104, generates an alarm signal AS that is supplied to an audible alarm transducer 216. In response to the AS signal the audible alarm transducer 216 generates an audible alarm to alert nearby people that an unauthorized person is moving the device 104 presumably in an attempt to steal the device. The audible alarm transducer 216 may be any suitable type of audio transducer such as a conventional speaker, a piezoelectric speaker, and so on. In response to the TSS signal indicating movement and presumed theft of the device 104, the processor 202 may, in addition to activating the AS signal, communicate a theft notification through the wireless communications circuitry 208 and over the wireless communications network 204 to the remote electronic devices 206, as will be described in more detail below.

The overall operation of the package delivery notification and protection system 102 will now be described in more detail with reference to FIG. 2. In this description, communications between the processor 202 and the remote electronic devices 206 will be described simply as the processor communicating with the remote electronic devices or conversely the remote electronic devices communicating with the processor. This is done for the sake of brevity and to eliminate the need to repeatedly state that the processor 202 communicates through the wireless communications circuitry 208 and over the wireless communications network 204 with the remote electronic devices 206. The same is true for communications from the remote electronic devices 206 to the processor 202. Also, in the following description communications may be described as being between the package delivery notification and protection device 104 and the remote electronic devices 206 instead of between the processor 202 and the remote electronic devices. Once again this is done merely to simplify the description. The processor 202 controls the overall operation of the package delivery notification and protection device 104 and so communications are simply described as being between the package delivery notification and protection device 104 and the remote electronic devices 206.

In operation, the package delivery notification and protection system 102 operates in six modes: 1) system configuration mode; 2) standby mode; 3) package delivered mode; 4) unauthorized package removal mode; 5) package retrieval mode; and 6) theft mode. Each of these modes will now be described in more detail. Initially, the system 102 operates in the system configuration mode during which the package delivery notification and protection device 104 is connected to the wireless communications network 204 and the remote electronic devices 206 that are authorized to communicate with the package delivery notification and protection device are configured. The precise way in which this is done may vary as will be appreciated by those skilled in the art. For example, the remote electronic device 206a may download and install the app 214 and may thereafter utilize the app to connect the package delivery notification and protection device 104 to the wireless router 110 and thereby to the wireless communications network 204. In this way, the remote electronic device 206a establishes the safe circle 212 and becomes one of the remote electronic devices in the safe circle that is allowed to communicate with the package delivery notification and protection device 104. Only the remote electronic devices 206 in the safe circle 212 are authorized to communicate with the device 104. In an alternative embodiment, the package protection device may be directly wired to a user's home security system or connected wirelessly to the home security system or the wireless communication system.

During the system configuration mode, the remote electronic device 206a also sends invitations to the other remote electronic devices 206a and 206b to join the safe circle 212 so that these other remote electronic devices are also authorized to communicate with the package delivery notification and protection device 104. These invitations could be in the form of an email sent to the other remote electronic devices 206a and 206b, or a text message or any other suitable type of message. The safe circle 212 may include only the remote electronic device 206a and need not include multiple remote electronic devices. Furthermore, the invitations sent by the remote electronic device 206a may be sent to the other remote electronic devices 206b-c at a later time and need not be sent initially during the system configuration mode. Through the initial remote electronic device 206a, remote electronic devices may be added to and removed from the safe circle 212 over time and as the need arises. As previously mentioned, only the remote electronic devices 206 in the safe circle 212 are authorized to communicate with the device 104. A unique identifier UID stored in memory (not shown) of the processor 202 in the package delivery notification a protection device 104 prevents a thief from stealing the device off the doorstep 106 of the house 100 in FIG. 1 and utilizing the device for themselves since this unique identifier becomes associated with the safe circle 212 and a new safe circle cannot be established for the device with this unique identifier.

After the system configuration mode, the package delivery notification and protection device 104 is positioned in the desired location on the doorstep 106 of the house 100 of FIG. 1. This positioning could of course be done prior to operation in the system configuration mode. Once in position on the doorstep 106, the package delivery notification and protection system 102 operates in the standby mode. In the standby mode, the processor 202 monitors the package sensor signal PSS, theft sensor signal TSS and communications from the remote electronic devices 206 operates in one of the remaining modes based upon these signals and communications. The order listed for these modes is accordingly not predetermined but is based upon sensed events. The modes will be discussed in the order listed merely to describe each mode.

In one embodiment, the device itself is configured to alarm if moved past a user selected distance from or above the porch. This can deter a potential thief from removing the package protection device in advance of a delivery to avoid the alarm. The user will be informed that the device has been moved outside of the user defined range from the house. As in other embodiments, the camera may also provide images of the porch in this situation.

The package delivery notification and protection system 102 operates in the package delivered mode in response to the package sensor signal PSS from the package sensor 200 indicating that a package, such as the package 108 illustrated in FIG. 1, has been placed on the package sensor. In response to the PSS signal indicating a package has been placed on the package sensor 200, the processor 202 sends a delivery notification over the wireless communications network 204 to the remote electronic devices 206. In addition to the delivery notification indicating that a new package has been delivered by being physically placed on the package sensor 200, this delivery notification also includes the date and time of the delivery. The delivery notification may further include the weight of the delivered package. The processor 202 determines the date and time from the wireless communications network 204 or in any other suitable manner, and also processes the package sensor signal PSS generated by the package sensor 200 to determine the weight of the delivered package. The specific manner in which the processor 202 processes the PSS signal to determine the weight of the delivered package will of course vary depending on the specific type of sensor being utilized for the package sensor 200, as will be appreciated by those skilled in the art.

In one embodiment, the processor 202 also delays in providing the delivery notification for a period of time after detecting the PSS signal indicates a package has been placed on the package sensor 200. For example, the processor may delay for five-sixty seconds after detecting the PSS signal indicates a package has been placed on the package sensor 200. After five-sixty seconds, the processor 202 would detect the value of the PSS signal to see if the signal still has a value indicating a package has been placed on the package sensor 200. The processor 202 will send the delivery notification only if the PSS signal still has a value indicating a package has been delivered after this second detection of the value of the PSS signal. This prevents inadvertent reporting of the delivery of a package and subsequent erroneous activation of the audible alarm transducer 206 where an item other than a package may temporarily be present on the package sensor 200. For example, a cat, dog, or other animal may step on the package sensor 200 in walking across the porch of the house 100 (FIG. 1). This approach would prevent or at least reduce occurrences of the device 104 erroneously reporting delivery of a package, and subsequent triggering of the audible alarm transducer 206 upon the presumed package being ostensibly removed.

Figure 3:
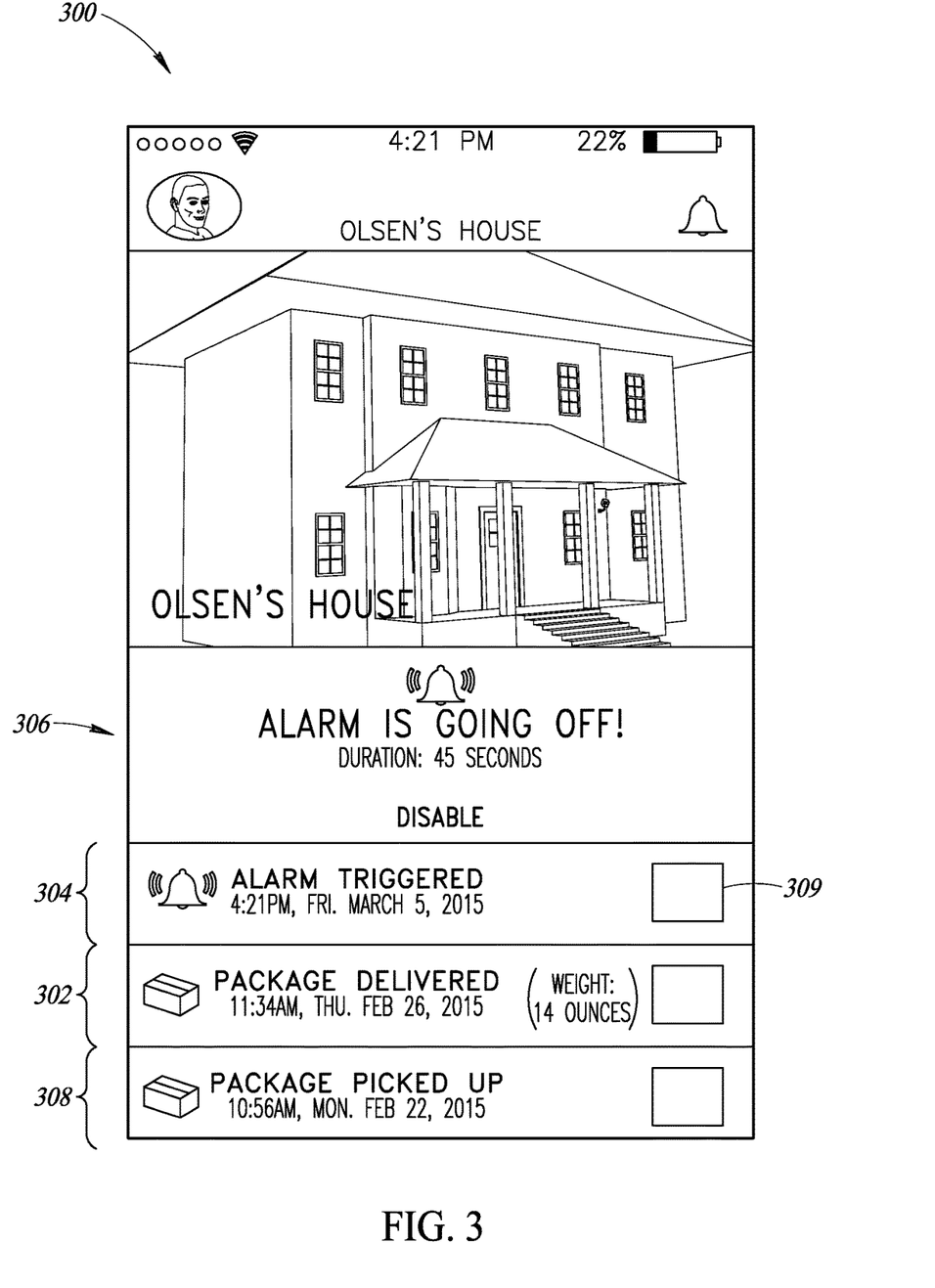
FIG. 3 is a sample screen shot displayed by an application running on remote electronic devices in the package delivery notification and protection system of FIG. 2 according to one embodiment of present disclosure.

Upon receiving the delivery notification, the app 214 running on the remote electronic devices 206 provides a notification to a user of each remote electronic device that a package has been delivered. This notification may take a variety of forms and could include an audible tone as well as a visual alert for the user. In one embodiment, the camera can provide live video or an image of the porch to the app 214 showing the package on the package delivery notification and protection device 104. FIG. 3 is a sample screen shot 300 displayed by the app 214 running on the remote electronic devices 206 in the package delivery notification and protection system 102 of FIG. 2. In this sample screen shot 300, a visual package delivered alert or notification 302 is displayed near the bottom of the screen. The visual package delivered notification 302 indicates that a package has been delivered by being physically placed on the package sensor 200 and also indicates the date in time of this delivery. The package weight may also be displayed as part of the package delivered notification 302 as shown in FIG. 3.

Each time a new package is placed on the package sensor 200, the package sensor 200 generates the PSS signal indicating delivery of a new package has been detected and the processor 202 sends a corresponding delivery notification to the remote electronic devices 206. In this way, users of the remote electronic devices 206 are notified of each package delivery. In one embodiment, the package sensor 200 is a load sensor such as a weight sensor or a pressure sensor. Where the package sensor 200 is a pressure sensor, for example, the pressure sensor will generate the PSS signal indicating the pressure applied by a first package placed on the package sensor. If at a later time a second package is placed on the first package, the package sensor 200 accordingly generates the PSS signal indicating a new pressure applied by the first and second packages. The processor 202 detects this change in the PSS signal indicating an additional package has been placed on the package sensor and sends a new delivery notification to the remote electronic devices 206 each time such a change in the PSS signal is detected. The processor 202 may utilize the difference or change in value of the PSS signal to determine the weight of the newly delivered package or packages, as will be appreciated by those skilled in the art.

Simultaneous placement of multiple packages on the package sensor 200 will with this approach be detected as delivery of a single package. Thus, each package delivery notification communicated by the processor 202 to the remote electronic devices 206 may indicate that a single new package has been placed on the package sensor 200 or multiple new packages have simultaneously been placed on the package sensor. The latter would occur where a delivery person stacks multiple packages and then simultaneously places these stacked packages on the package sensor 200 of the package delivery notification and protection device 104.

Between each occurrence of a delivered package when the system 102 operates in the package delivered mode, the system 102 operates in the standby mode waiting for the next event to occur. As just described, each time a new package is placed on the package sensor 200, the package sensor 200 generates the PSS signal indicating delivery of a new package has been detected and the processor 202 sends a corresponding delivery notification to the remote electronic devices 206. Once the system 102 has operated in the package delivered mode at least once, indicating delivery of at least one package has occurred, the system operates in the unauthorized package removal mode if the PSS signal indicates a package has been removed from the package sensor 200 without authorization. Authorization for removal of a package or packages from the device 104 occurs during the package retrieval mode, which is initiated by one of the remote electronic devices 206 sending a retrieval notification to the processor 202, as will be described in more detail below.

When a new package has been placed on the package sensor 200 the PSS signal indicates increased pressure where the package sensor is a pressure sensor. Conversely, if a package or packages is removed the PSS signal will indicate a lower pressure. Thus, if the processor 202 detects the PSS signal indicates a package has been removed from the package sensor 200 and the system 102 is not operating in the package retrieval mode in response to receipt of a retrieval notification, the system operates in the unauthorized package removal mode. In this mode, upon detecting that the PSS signal indicating a package or packages has been removed from the package sensor 200, the processor circuitry 200 sends an alarm notification to the remote electronic devices 200 and activates the alarm signal AS to thereby activate the audible alarm transducer 216 to sound an audible alarm indicating unauthorized removal of the package or packages.

In response to receipt of the alarm notification, each of the apps 214 running on the remote electronic devices 206 displays an alarm triggered notification to notify the users of the remote electronic devices that an unauthorized event has occurred. This notification may also take a variety of forms and could include an audible tone as well as a visual alert for the user. In the example of FIG. 3, a visual alarm triggered alert or notification 304 is displayed in the bottom-center of the screen along with an alert or notification 306 prominently displayed in the center of the screen indicating "Alarm is going off" letting the user know the audible alarm transducer 216 has been activated. The notification 306 also indicates the duration for which the alarm transducer 216 has been activated and allows the user to disable the alarm remotely by pressing the "Disable" text displayed as part of the notification 306. In response to the user pressing the "Disable" text, the app 214 sends an alarm disable notification to the processor 202 and the processor, in response to receiving the alarm disable notification, deactivates the AS signal to thereby terminate activation of the audible alarm transducer 216. The user may opt to have the real time video or image stream of the porch be provided to the app so that when an alarm has triggered, the user can determine whether to disable the alarm. If the user has a security system, the app may correspond with the security system such that the user may inform their security provider that there is an active theft at their home and to send someone to their home immediately.

Typically, there will be no unauthorized removal of the packages placed on the package sensor 200 resulting in the package delivery notification and protection system 102 operating in the unauthorized package removal mode as just described. Instead, once the users of the remote electronic devices 206 have been notified that a package or packages have been delivered in the package delivered mode, one of the users will go to retrieve the package or packages from the package delivery notification and protection device 104. If the user doing so was to simply remove the package from the package sensor 200, the system 102 would have no way of knowing that the person removing the package was authorized to do so and accordingly would operate as just described in the unauthorized package removal mode of operation, including activation of the audible alarm transducer 216. As a result, before removing a package from the package sensor 200 the user must input his intent to retrieve the package to the app 214 running on the corresponding remote electronic device 206 of the user. The graphical portions displayed by the app 214 to allow the user to do so are not illustrated in the screenshot 300 of FIG. 3 but may be done in any suitable manner, as will be appreciated by those skilled in the art. In one embodiment, a user must input a personal identification number (PIN), or some other secret code known only to members of the safe circle 212, in order to retrieve a package. In one embodiment, the package delivery notification and protection device may include a fingerprint sensor or a key pad such that the user can deactivate the system to retrieve their packages by scanning their fingerprint or entering in a pin number.

In response to the user inputting his PIN or alternatively indicating his intent to retrieve a delivered package to the app 214, the system 102 operates in the package retrieval mode of operation and the app sends a package removal notification to the processor 202. The processor 202, in response to the package removal notification, does not activate the audible alarm transducer 216 or send the alarm notification to the remote electronic devices 206 when the PSS signal from the package sensor 200 indicates that a package has been removed from the package sensor. Also, in response to detecting the PSS signal indicating that a package or packages have been removed from the package sensor 200, the processor 202 generates a package retrieval notification indicating that a package or packages have been retrieved, along with the date and time of this retrieval. The processor 202 sends the package retrieval notification to the apps 214 running on the remote electronic devices 206.

In response to receiving the package retrieval notification, each of the apps 214 displays a package retrieved alert or notification 308 letting all users in the safe circle 212 know that a delivered package or packages has been picked up by one of the users in the safe circle. In the screenshot 300 of FIG. 3, the package retrieved notification 308 is shown at the bottom of the screen including the text "Package Picked Up" along with the date and time of this pickup or retrieval of the package or packages. As described for prior notifications, the notification 308 may take a variety of different forms and may also include an audible alert or display of an icon notification near the upper edge of the screen, or a combination of all such notifications. Each of the notifications 302, 304 and 308 may include an image 309, as labelled for notification 304, where the image may be a predetermined image associated with the type of the notification or may be an image captured by the camera 112 (FIGS. 1 and 2) in association with the type of notification.

Finally, the package delivery notification and protection system 102 operates in the theft mode in response to the system operates in the unauthorized package removal mode. In this mode, upon detecting that the PSS signal indicating a package or packages has been removed from the package sensor 200, the processor circuitry 200 sends a theft alarm notification to the remote electronic devices 206 and activates the AS signal to thereby activate the audible alarm transducer 216 to sound an audible alarm. The theft alarm notification may be the same as the alarm notification sent during the unauthorized package removal mode of operation or may be a separate notification. Where the two alarm notifications are the same the app 214 may simply display the alarm triggered notification 304 and associated notification 306 as previously described. In this situation the users of the remote electronic devices 206 would know that either a package or packages had been removed from the package delivery notification and protection device 104 without authorization or that the device itself had been stolen. Where a separate theft alarm notification is sent, the app 214 may display information in the notifications indicating whether unauthorized removal of a package or packages has occurred or the package delivery notification a protection device 104 has been stolen. In another embodiment of the device 104, the device can further include a tracking beacon (not shown in FIG. 2) such as a Global Positioning System (GPS) tracking beacon that provides location or position information for the device 104. This position information could then be accessed by the app 214 to allow a user to identify the location of the device 104 in the event the device is stolen.

The package delivery notification and protection system 102 includes the camera 112 as previously described. The camera 112 may be any suitable type of camera for recording still images and/or video. In one embodiment, the camera 112 is motion activated and records photographs and/or video when motion is detected in the location on the doorstep 106 (FIG. 1) where the package delivery notification and protection device 104 is located. Instead being triggered by motion, in another embodiment the camera 112 starts capturing images or video immediately in response to detection of a package being placed on the package sensor 200 or when unauthorized removal of a package or packages form the package sensor 200 (i.e., operation in the unauthorized package removal mode) or theft of the package delivery notification and protection device 104 itself (i.e., movement detected in the theft mode). The camera 112 can send the captured images and/or video to the app 214 running on the remote electronic devices 206 so the users in the safe circle 212 can view the captured images or video and forward the information to authorities if desired. The app 214 also allows a user to access and configure the camera 112. In one embodiment of the system 102, the app 214 also receives notifications regarding operation of the camera, such as when batteries powering the camera are low and should be replaced. Similar notifications may also be provided to the app 214 by the processor 202 regarding batteries powering the device 104.

In one embodiment of the package delivery notification and protection device 104, the device includes only the processor 202 and wireless communications circuitry 208. In this embodiment, the processor 202 sends to the remote electronic devices 206 a delivery notification including the time and date a package was placed on package sensor 200. The deliver notification may also include the weight of the delivered package as previously discussed. This embodiment provides users with precise information regarding when a particular package was actually physically placed on the package sensor 200 and thereby actually physically received at the location of the device 104.

Figure 4:
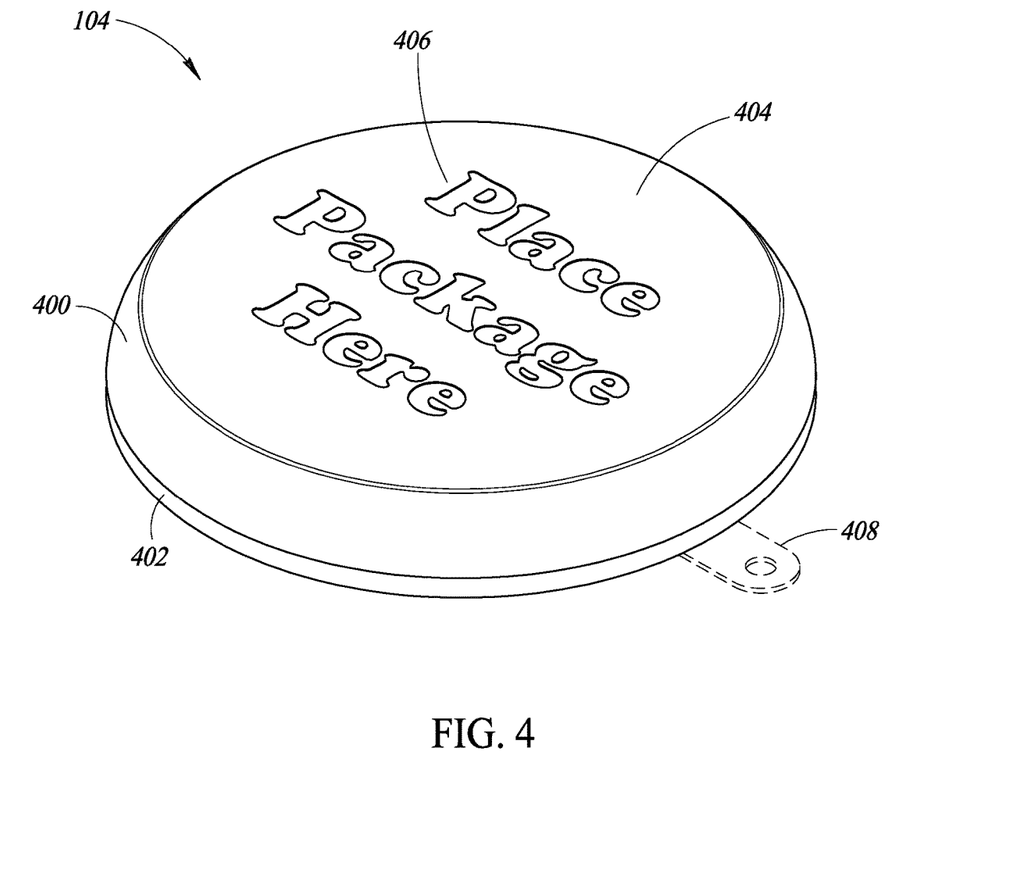
FIG. 4 is a perspective view of one embodiment of the package delivery notification and protection device of FIGS. 1 and 2.

FIG. 4 is a perspective view of one embodiment of the package delivery notification and protection device 104 of FIGS. 1 and 2. The package delivery notification and protection device 104 includes an upper housing 400 and a lower housing 402 for containing the electronic components 200, 202, 208, 215 and 216 of FIG. 2. The top of the upper housing 400 forms a placement surface 404 for a package and may include descriptive text 406 as shown to help ensure a delivery person delivering a package actually places the package on the package delivery notification and protection device 104 and not elsewhere on the doorstep 106 (FIG. 1). In the embodiment of FIG. 4, the lower housing 402 may include an attachment tab 408 including a hole to receive an attachment device like a screw for physically attaching the device 104 to a surface, such as a porch, on which the device is placed. Securing the device 104 to such a surface dissuades theft of the device and also prevents innocent movement of the device that could result in inadvertent triggering of the audible alarm transducer 216 due to the device theft sensor 215 detecting such movement. The device 104 may be attached to the desired surface in different ways other than the attachment tab 408 and associated attachment device. For example, the device 104 may be mounted to the desired surface through heavy duty double sided tape or adhesive pads. In the embodiment of FIG. 4, the upper housing 400 rests on the outer portion of the lower housing 402 while in other embodiments, such as that shown in FIG. 5, the lower housing 402 fits within the upper housing 400.

Figure 5:
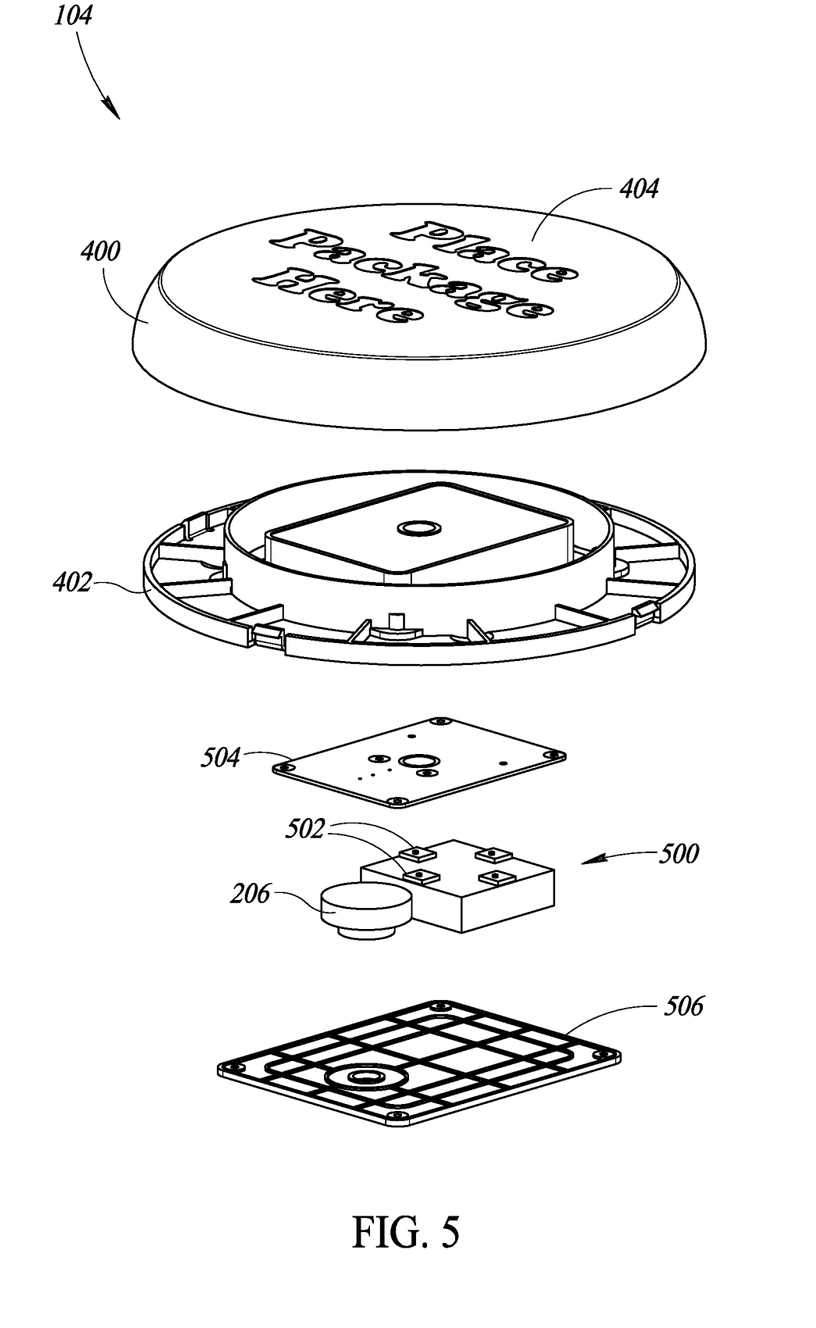
FIG. 5 is an exploded view of the package delivery notification and protection device of FIG. 4.

FIG. 5 is an exploded view of the package delivery notification and protection device 104 of FIG. 4. In this embodiment, the upper housing 400 rests on a weight sensing module 500 that includes one or more weight sensors 502, the weight sensing module being attached to a printed circuit board 504 when the device 104 is assembled. The weight of a package placed on the placement surface 404 of the upper housing 400 is sensed by the weight sensors 502 of the weight sensing module 500. The placement surface 404 of the upper housing 400 and weight sensing module 500 collectively form the package sensor 200 in the embodiment of FIG. 5. The weight sensing module 500 includes the electronic components of the package sensor 200, including the one or more weight sensors 502 that are each pressure sensors in one embodiment. In various embodiments, package sensor 200 includes any suitable type and number of sensors 502 for the weight sensing module 500, where the sensors 502 may be force sensors, weight sensors, pressure sensors, load cells, and so on. The particular arrangement of the sensors 502 may also vary in different embodiments of the device 104. For example, in one embodiment the weight sensing module 500 includes four weight sensors 502 that are physically located in projections or "feet" (not shown in FIG. 5) extending from a lower surface of the lower housing 402. In other embodiments, the package sensor 200 may include any other suitable type of sensor or sensors for sensing the presence of a package on the placement surface 404 of the upper housing 400, such as image capture and processing circuitry. The other components of the package delivery notification and protection device 104 described with reference to FIG. 2, such as the processor 202, wireless communications circuitry 208, device theft sensor 215 and audible alarm transducer 216 are, although not shown in FIG. 5, contained on the printed circuit board 504 and coupled to the weight sensing module 500. The audible alarm transducer 216 (FIG. 2) is also coupled to the circuit board 504 when the device 104 is assembled and is shown in FIG. 5. A power supply (not shown), which would typically include at least one battery would also be electrically coupled to the printed circuit board 504 for powering the electronic components contained thereon. A removable access door 506 that is part of the lower surface of the lower housing 402 when the device 104 is assembled is also shown in FIG. 5 and would be removable to allow a user to change the battery or batteries providing power to the device.

Figure 6:
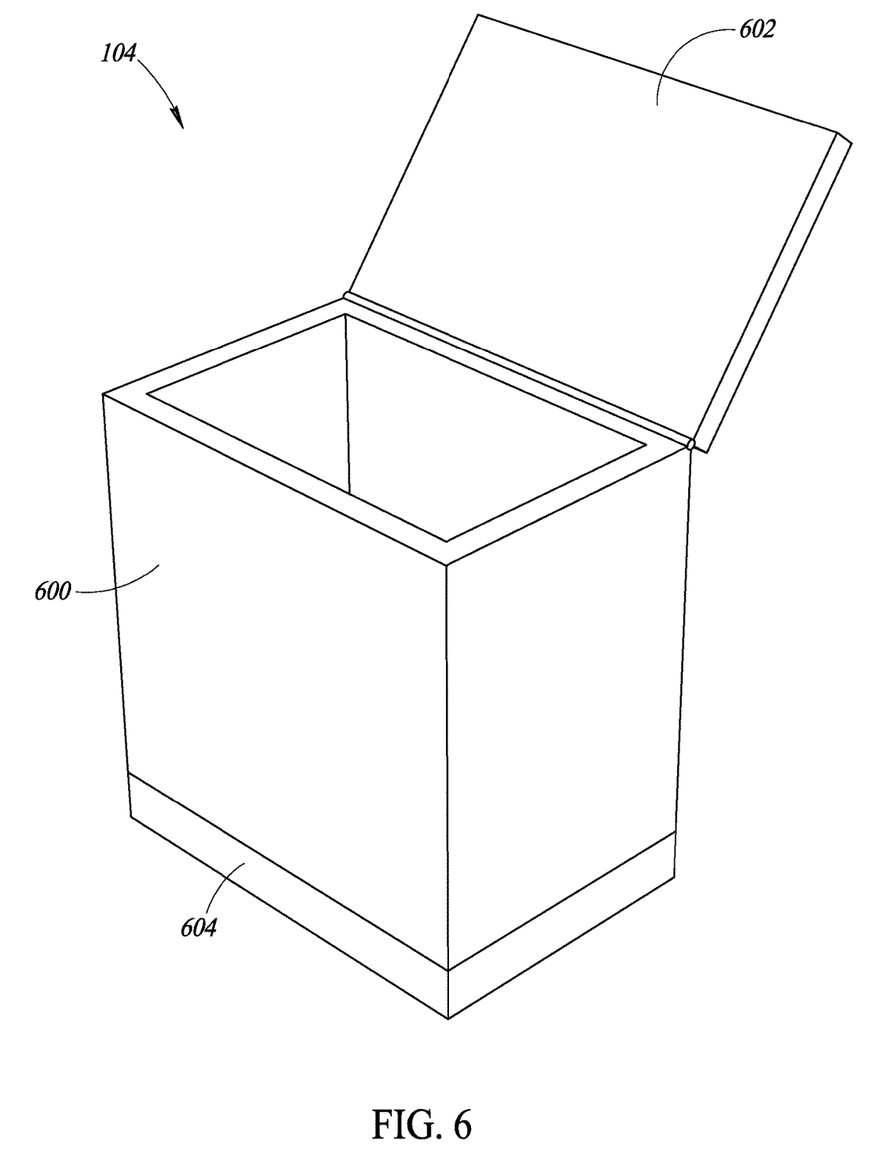
FIG. 6 is a perspective view of another embodiment of the package delivery notification and protection device of FIGS. 1 and 2.

Although the housings 400 and 402 of the package delivery notification and protection device 104 are shown as being circular in the embodiment of FIGS. 4 and 5, these housings may have different shapes in different embodiments of the device. The housings 400 and 402 could, for example, be rectangular or square in shape in alternative embodiments. In yet another possible embodiment, the housing of the package delivery notification and protection device 104 is a container or box as illustrated in FIG. 6, which is a perspective view of another embodiment of the device. In the embodiment of FIG. 6, the package delivery notification a protection device 104 includes a box-shaped housing 600 which may include a lid or cover 602. The electronics and package detection components of the device 104 are positioned at the bottom of the box-shaped housing 600 and are designated 604 in the embodiment of FIG. 6. In this embodiment, a delivery person opens the cover 602 and places a package being delivered inside the box-shaped housing 600 and thereafter closes the cover. The electronics and package detection component 604 detect delivery and removal of packages to and from the box-shaped housing 600 as previously described with reference to the embodiment of FIG. 2. The embodiment of FIG. 6 may be utilized in applications where it is advantageous if the package is being delivered are somewhat isolated from environmental elements and kept out of the site of people that may be passing by the device 104, such as where the packages are medical related and may include blood or other bodily fluids. Such a box can protect packages from the weather or be beneficial for light weight packages that may be moved by wind, such as the manilla envelopes.

In an alternative embodiment, the box-shaped housing may include a locking mechanism in the lid 602 such that when the delivery person closes the lid the locking mechanism seals the lid. In the event that there is another package to deliver the delivery person may select a button on the top of the lid or elsewhere on the device that indicates they have a package to deliver. This will then send a signal to the user through the app that there is a delivery. The user can then unlock the lid to allow the delivery person to place the next package in the box. The box includes the pressure or weight sensors such that the device will know if the weight decreases instead of increases.

In another embodiment, the device may be a wall mounted receptacle that is configured to receive the light weight packages, like manilla envelopes. A bottom of the receptacle will include the pressure sensor and be configured to communicate with the app to notify the user of a delivered package and of the removal of the package.

In another embodiment, the device may include a strap that can be wrapped around the package from one side of the device and be latched to the other side of the device. The device may have a mechanism to retract any excess portion of the strap to securely attach the package to the device. If someone tries to interfere with the strap or the package protection device, the device will alarm and notify the user. The strap may be locked in place during the standby mode while waiting for another package or for the user to return and retrieve the package. Similar to the option above, if a second package is delivered there may be button or other feature that allows the delivery person to contact the user through the app to temporarily release the strap to allow the second package to be added to the protection device.

In yet another embodiment, a wireless scanner as typically carried by delivery drivers communicates information related to the package being delivered to the device 104 (FIG. 1) and the device, in turn, communicates this information through suitable notifications over the wireless communications network 204 to the remote electronic device 206. In one alternative of this embodiment, the device 104 need not include the package sensor 200. Instead, the portable scanner would provide information such as weight of the package and time of physical placement of the package on the placement surface of the device 104 to the device for communication to the remote electronic devices 206. The package sensor 200 could be included, of course, in still further embodiments utilizing such a portable scanner so the package sensor could detect unauthorized removal of a delivered package or packages as described above.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A package delivery notification and protection device, comprising:
    a package sensor including a placement surface and a load sensor configured to generate a sensor signal based upon a load of a package placed on the placement surface;
    wireless communications circuitry configured to communicate over a wireless network; and processing circuitry coupled to the package sensor and coupled to the wireless communications circuitry to communicate over the wireless network, the processing circuitry configured to send a delivery notification over the wireless network responsive to the sensor signal indicating a package has been placed on the placement surface.

2. The package delivery notification and protection device of claim 1, wherein the delivery notification includes time and date information indicating when the package was placed on the placement surface of the package sensor.

3. The package delivery notification and protection device of claim 2, wherein the delivery notification further includes information indicating the weight of the package placed on the placement surface.

4. The package delivery notification and protection device of claim 3 further comprising:
 an alarm circuit coupled to the processing circuitry and configured to generate an audible alarm; and
 wherein the processing circuitry is further configured to control activation of the alarm circuit and sending of notifications over the wireless network based upon the sensor signal, wherein the load sensor is further configured to generate the sensor signal that is further based upon removal of the load from the placement surface to thereby indicate removal of the package from the placement surface.

5. The package delivery notification and protection device of claim 4, wherein the processing circuitry is further configured to receive a retrieval notification over the wireless network, the retrieval notification authorizing removal of a package from the placement surface.

6. The package delivery notification and protection device of claim 5, wherein the processing circuitry is further configured to send a removal notification over the wireless network and to not activate the alarm circuit responsive to the sensor signal indicating a package has been removed from the placement surface and receipt of the retrieval notification authorizing removal of the package.

7. The package delivery notification and protection device of claim 6, wherein the processing circuitry is further configured to send an alarm notification over the wireless network and to activate the alarm circuit responsive to the sensor signal indicating a package has been removed from the placement surface and no retrieval notification authorizing removal of the package being received.

8. The package delivery notification and protection device of claim 7, wherein the processing circuitry is further configured to receive an alarm deactivation notification over the wireless network, the processing circuitry configured to deactivate the alarm circuit in response to receive of the alarm deactivation notification.

9. The package delivery notification and protection device of claim 8 further comprising:
 an anti-theft sensor that generates a second sensor signal indicating movement of the package delivery notification and protection device; and
 wherein the processing circuitry is further configured to activate the alarm circuit responsive to the second sensor signal indicating movement of the package delivery notification and protection device.

10. The package delivery notification and protection device of claim 9, wherein the processing circuitry is further configured to send an alarm notification over the wireless network responsive to the second sensor signal indicating movement of the package delivery notification and protection device.

11. The package delivery notification and protection device of claim 10, wherein the alarm circuit comprises a speaker.

12. The package delivery notification and protection device of claim 1, wherein the wireless communications circuitry comprises at least one of Wi-Fi communications circuitry or Bluetooth communications circuitry.

13. A package delivery notification and protection device, comprising:
 a package sensor including a placement surface and configured to generate a sensor signal indicating whether a package has been placed on or removed from the placement surface, wherein the package sensor includes:
  a circular placement pad that forms the placement surface;
  at least one load sensor coupled to the circular placement pad and configured to generate the sensor signal,
 wireless communications circuitry configured to communicate over a wireless network, and
 processing circuitry coupled to the package sensor and coupled to the wireless communications circuitry to communicate over the wireless network, the processing circuitry configured to send a delivery notification over the wireless network responsive to the sensor signal indicating a package has been placed on the placement surface.

14. The package delivery notification and protection device of claim 13, wherein the load sensor comprises one of a weight sensor and a pressure sensor.

15. An electronic system, comprising:
 a package delivery notification and protection device, including:
  a package sensor including a placement surface, the sensor being configured to detect a change in pressure on the placement surface;
  an alarm circuit configured to generate an alarm;
  wireless communications circuitry; and
  processing circuitry coupled to the package sensor, the alarm circuit, and the wireless communications circuitry, the processing circuitry configured to activate the alarm and send a signal over the wireless communication circuitry to a user based on the change in pressure and the processing circuitry further configured to send a signal over the wireless communications circuitry to a plurality of users, each user being part of a safe circle associated with the package delivery notification and protection device, each user in the safe circle being authorized to receive notifications from and provide notifications to the processing circuitry of the package delivery notification and protection device.

16. The electronic system of claim 15, wherein the processing circuitry is configured to receive a retrieval notification from the user to authorize removal of a package from the placement surface, and the processing circuitry is further configured to control activation of the alarm circuit and send notifications based upon the sensor signal and the retrieval notification.

17. The electronic system of claim 15, wherein one of the users in the safe circle sends invitations to other users to join the safe circle.

18. The electronic system of claim 17, wherein the one user in the safe circle sends email invitations to the other users.

19. The electronic system of claim 18, wherein each user in the safe circle utilizes an application executing on an electronic device to communicate with the package delivery notification and protection device.

20. A method of delivering a package, comprising:
placing a package on a package placement surface, the package placement surface being located proximate a delivery address of the package;
sensing with a load sensor a placement of the package on the package placement surface; and
sending a delivery notification to a recipient of the package in response to sensing the package has been placed on the package placement surface.

21. The method of claim 20 further comprising:
receiving a retrieval notification authorizing removal of the package from the placement surface;
sensing removal of the package from the package placement surface; and
sending a removal notification responsive to sensing the package has been removed from the placement surface and receipt of the retrieval notification authorizing removal of the package from the placement surface.

\* \* \* \* \*